June 19, 1962     R. A. CONRAD     3,040,217

ELECTROMAGNETIC ACTUATOR

Filed Aug. 10, 1959

United States Patent Office 3,040,217
Patented June 19, 1962

3,040,217
ELECTROMAGNETIC ACTUATOR
Richard A. Conrad, Vista, Calif., assignor to Clary Corporation, San Gabriel, Calif., a corporation of California
Filed Aug. 10, 1959, Ser. No. 832,625
8 Claims. (Cl. 317—172)

This invention relates to remotely controlled actuators and has particular reference to electromagnetic type actuators effective to move a device controlled thereby to either of two alternate conditions.

In the field of guided missiles, space vehicles, etc., it is often desirable to set a valve or other device from one operating condition to another. For example, it may be necessary to move a valve between an open and a closed condition.

Heretofore, two position actuators of the above type have usually comprise a biasing spring effective to normally hold the device to be controlled in one condition and an electromagnetic device, such as a solenoid, which when energized overcomes the spring to move the device to its alternate condition. In this case, the electromagnetic device must be held energized as long as it is desired to maintain the device in such alternate condition.

Other arrangements have been developed to eliminate the need for a biasing spring. One such arrangement comprises a pair of solenoids or the like, one to move the device to one condition and the other to move the device to its alternate condition. However, in such case, one or more detents are normally provided to retain the device in its set condition against vibration and other forces, or again, the selected solenoid is held energized as long as the device is to be maintained in the corresponding condition.

Although such above type actuators are generally satisfactory they present difficulties when used in connection with guided missiles or the like, particularly where weight, space and energy are at a premium.

When a biasing spring is used to maintain the actuated device in one operating condition, such spring must be strong enough to hold the device in place against vibration, acceleration, deceleration and possibly other forces. Thus, the electromagnetic solenoid or other type actuator must be strong enough to both overcome the force of the spring and hold the device in its alternate condition. This not only requires a relatively heavy electromagnetic solenoid or coil but also requires a relatively strong electric current in order to operate the same. Also, such current must be maintained throughout the period in which the device is to be maintained in its alternate condition. In the case of guided missiles and the like, this represents a heavy current drain on any batteries used to supply current to the device.

In the case where two electromagnetic devices are provided to alternately set the actuated device in one or the other of two conditions, latching or spring detents have usually been provided heretofore, which detents must be strong enough to hold the device against vibration and other forces, unless a constant current is supplied to the selected electromagnetic device. This arrangement also requires the electromagnetic device to exert considerably more energy than that necessary merely to move the device between its alternate operating conditions in order to overcome the force exerted by the detent or detents.

Therefore it becomes a principal object of the present invention to overcome the above noted problems.

Another object is to eliminate the necessity of using springs or spring detents in maintaining a two-position actuator in either of two positions.

Another object is to reduce the force necessary to move a two-position actuator from one position to another.

Another object is to increase the speed of operation of an electromagnetic device of the above type.

Another object is to reduce the weight of an electromagnetic device of the above type.

Another object is to enable an electromagnetic device of the above type to be operated solely by pulses rather than by a sustained electrical current.

The manner in which the above and other objects are accomplished will be readily understood on reference to the following specification when read in conjunction with the accompanying drawings, wherein.

Figure 1:
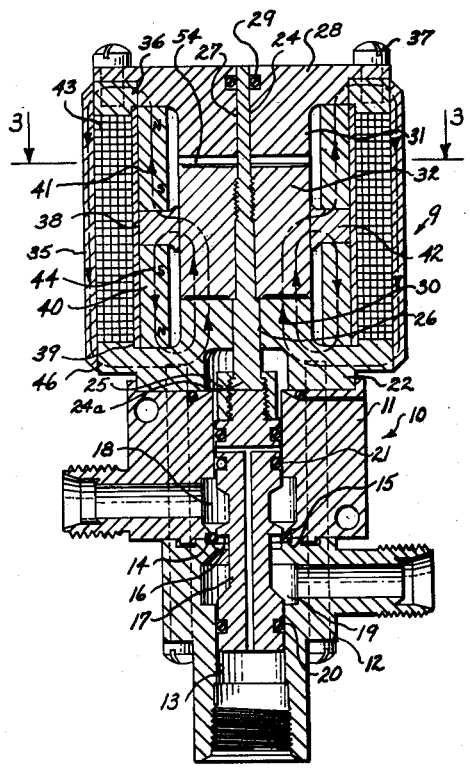
FIG. 1 is a longitudinal section view through an electromagnetic actuator associated with a two-way valve and embodying a preferred form of the present invention.

Referring to the drawings, the electromagnetic actuator, generally indicated at 9, is illustrated as being operatively connected to a two-way valve generally indicated at 10. The valve construction per se forms no part of the present invention and is illustrated only to show an exemplary application to which the actuator 9 may be applied, it being understood that the actuator may be equally applied to other devices such as switches, indicators, control devices, etc.

The valve comprises a body formed of two parts 11 and 12 having a longitudinal bore 13 therethrough. An annular ring 14 of resilient material is clamped between annular grooved shoulders 15 surrounding the bore and formed on adjoining faces of the valve parts 11 and 12. The ring 14 forms a port which cooperates with a valve seat 16 formed on a poppet 17 which is slideable in the bore 13.

Directly below the ring 14 is a fluid inlet chamber 19 forming part of an inlet connection. Directly above the ring 14 is a fluid outlet chamber 18 forming part of an outlet connection.

O-rings 20 and 21 are mounted in grooves formed in the poppet 17 on opposite sides of the valve seat 16 to prevent leakage of fluid along the bore.

It will be noted that the diameter of the outside edge of the valve seat 16 is substantially the same diameter as the inside diameter of the bore 13 so that any fluid pressures exerted against the poppet are substantially balanced.

The body parts 11 and 12 are clamped against each other and against an end member 22 of the actuator 9 by clamp screws 23 which are threaded into the end member.

An actuator rod 24 is removably secured to the poppet 17 by a bushing 25 fitted over a head 24a of the lower end of the actuator rod and threaded onto the poppet. The actuator rod is slideable endwise in bearings 26 and 27 formed in the end member 22 and in a second end member 28, respectively. An O-ring 29 is mounted in a groove formed in the end member 28 and slideably engages the actuator rod 24 to prevent entrance of dirt and the like into the interior of the actuator.

The end members 22 and 28 are formed of magnetizable material such as iron having a relatively high magnetic permeability and having inwardly extending cylindrical bosses 30 and 31, respectively, formed concentric with the actuator rod. An armature 32, also of magnetizable material such as iron, and having substantially the same outside diameter as that of the bosses 30 and 31 is secured through a threaded connection to the actuator rod 24. A gap 54 is provided between the armature and the inner end faces of the bosses 30 and 31 to permit longitudinal movement of the armature sufficiently to move the poppet from its closed condition shown in FIG. 1 to its open position shown in FIG. 2.

A shell 35 of magnetizable material is suitably attached, as by soldering or welding, at its lower end to the end member 22 and is attached at its upper end to a retainer ring 36, also of magnetizable material, and in effect forming part of the end member 28. The end member 28 is removably attached to the latter ring 36 by cap screws 37.

A core sleeve 38 of non-magnetic material, such as brass, is fitted in counterbores, i.e., 39, formed in the end member 22 and ring 36 to slideably receive cylindrical ring members 40 and 41 formed of permanent magnet material, preferably of the type commercially known as "Alnico" alloy or "Index V." A ring 42 of magnetizable material, such as iron, is interposed between the permanent magnet ring members 40 and 41. The ring members 40 and 41 and the ring 42 are clamped in position by the end members 22 and 28.

It will be noted that the ring 42 closely surrounds the periphery of the armature 32 while the inner peripheral surfaces of the permanent magnet ring members 40 and 41 are spaced somewhat from the periphery of the armature and the end bosses 30 and 31.

An electromagnetic coil 43 is wound over the core 38 between the end member 22 and the ring 36.

It will further be noted that the permanent magnet ring members are oppositely polarized. That is, for example, the ring members are arranged in N, S, S, N relation, the adjacent end faces being illustrated as presenting south poles. Thus, when the valve is in a closed condition wherein the armature 32 is lowered into engagement with the boss 30 of end member 22, as shown in FIG. 1, the two permanent magnet ring members set up magnetic flux paths which reinforce each other to hold the armature in such condition against any vibration, acceleration, deceleration or other forces which might otherwise tend to open the valve. In this case, the permanent magnet ring member 40 establishes a flux path indicated diagrammatically by the dot-dash lines 44 extending in looped fashion through the adjacent portions of the boss 30 of the lower end member 22, armature 32 and ring 42; the permanent magnet ring member 41 establishes a primary flux path indicated by the dot-dash line 46 extending through the ring 36, shell 35, end member 22 and its boss 30, armature 32 and ring 42. As shown in FIG. 1 this primary flux path reinforces the flux path 44 to maintain the armature in place. Since the armature is in substantial contact with the boss 30, the flux path presents a relatively low magnetic reluctance and therefore a relatively high force of attraction exists between these parts. At the same time there is a secondary flux path presented to permanent magnet ring 41 through the adjacent portions of the ring 42, armature 32, air gap 54 and boss 31. This secondary flux path presents a relatively high reluctance due to the air gap and therefore a relatively low force of attraction exists between these parts.

Figure 4:
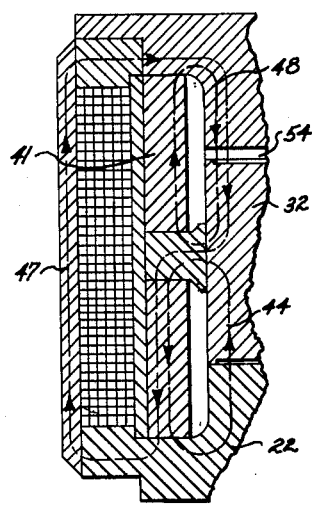
FIG. 4 is a fragmentary sectional view, similar to FIG. 1, and illustrating the flux path induced by the actuator coil to move the armature from its lowermost position to its uppermost position.

Application of a pulse in the appropriate direction through the coil 43 sets up a flux path indicated generally by the dot-dash lines 47, FIG. 4, which opposes and overcomes the lines of force comprising flux path 46. This new flux path 47 finds the magnetic reluctance of the air gap 54 less than the reluctance of the permanent magnet ring member 41 and, accordingly, it reinforces the secondary flux path indicated by the dot-dash line 48 established across the air gap by the permanent magnet ring member 41. However, because of the polarity of the permanent magnet ring member 40, the flux path 47 is reinforced and drawn through the same. The resulting lines of force weaken the force of attraction between the armature 32 and the lower end member 22 now established by the flux path 44 and moves the armature upward into its alternate position of FIG. 2.

Figure 2:
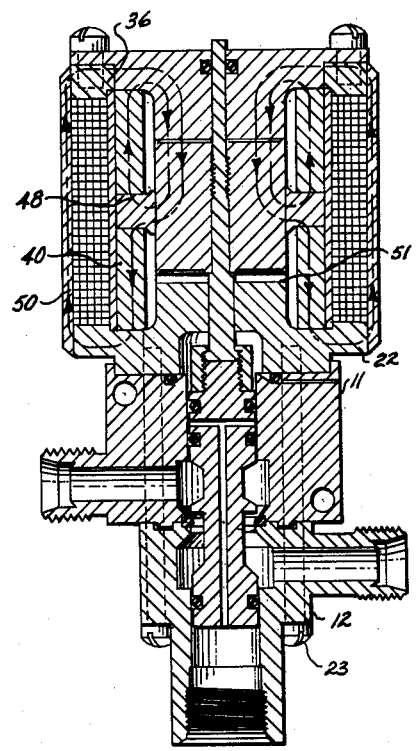
FIG. 2 is a sectional view similar to FIG. 1 but illustrating the actuator and valve in alternate conditions.
Figure 3:
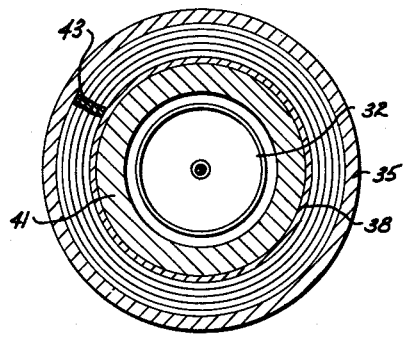
FIG. 3 is a sectional plan view taken substantially along the line 3—3 of FIG. 1.

As the coil 43 becomes deenergized, the flux path established by the permanent magnets 40 and 41, and shown in FIG. 2, will be found to be directly opposite to those set up in the original condition of the actuator as shown in FIG. 1. That is, since the armature 32 is now in its uppermost condition substantially in contact with the boss 31 of the upper end member 28, the flux path 48 will be at its maximum strength due to the closing of the air gap 54 and will be reinforced by a new flux path 50 established by the lower permanent magnetic ring member 40, which path extends through the shell 35, ring 36, end member 28 and its boss 31, armature 32, and ring 42. Obviously, the looped flux path 44 established by the magnet 40 will be considerably weakened by the formation of the new air gap 51 between the armature and the lower end member 22. From the foregoing it will be seen that a magnetic toggle action occurs, causing a snap action of the armature in moving from its position in FIG. 1 to its position of FIG. 2 and vice versa. Therefore, the duration of the pulse applied to the coil 43 need only be sufficient to advance the armature slightly beyond a midway position at which time the magnetic forces are reversed to carry the armature on to the extreme of its travel.

Actuation of the armature and the valve from their upper position of FIG. 2 to their lower position of FIG. 1 is effected by applying a pulse in a reverse direction to the coil 43, the operation being the same but in an opposite sense to that described above.

It will be noted that since the magnets 40 and 41 reinforce each other to hold the armature 32 in either of its two end positions, a relatively large holding force is provided to hold the armature in position. However, if desired, a sustained current in the appropriate direction may be applied to the coil 43 to retain the armature in position.

Although I have described my invention in detail and have therefore used certain specific terms and languages herein, it is to be understood that the present disclosure is illustrative rather than restrictive and that changes and modifications may be made without departing from the spirit or scope of the invention as set forth in the appended claims.

Having thus described the invention what I desire to secure by United States Letters Patent is:

1. An electromagnetic actuator comprising a pair of spaced end members of magnetic material, an armature of magnetic material intermediate said end members, means supporting said armature for endwise movement from a first position adjacent a first one of said end members to a second position adjacent a second one of said end members, a pair of oppositely polarized permanent magnet ring members surrounding said armature and interposed between said end members, a ring of magnetic material interposed between said permanent magnet ring members and surrounding said armature, said permanent magnet ring members each inducing a magnetic flux in said first end member and in said ring and in said armature whereby to maintain said armature in said first position, and an electromagnetic coil surrounding said permanent magnet ring members and said ring, said coil when electrically energized being effective to oppose said flux induced by one of said permanent magnet ring members and to induce a flux between said second end member and said armature whereby to move said armature from said first position to said second position, said permanent magnet ring members each inducing a magnetic flux in said second end member and in said ring and in said armature when said armature is moved into said second position whereby to maintain said armature in said second position.

2. An electromagnetic actuator comprising a pair of spaced end members of magnetic material, an armature of magnetic material intermediate said end members, means supporting said armature for endwise movement from a first position adjacent a first one of said end members to a second position adjacent a second one of said end memebrs, a pair of oppositely polarized permanent magnet ring members surrounding said armature and interposed between said end members, said permanent magnet ring members each inducing a magnetic flux in said first end member and in said armature whereby to maintain said armature in said first position, and an electromagnetic coil surrounding said permanent magnet ring members, said coil when electrically energized being effective to oppose said flux induced by one of said permanent magnet ring members and to induce a flux between said second end member and said armature whereby to move said armature from said first opsition to said second position, said permanent magnet ring members each inducing a magnetic flux in said second end member and in said armature when said armature is moved into said second position whereby to maintain said armature in said second position.

3. An electromagnetic actuator comprising spaced first and second end members of magnetic material, an armature of magnetic material intermediate said end members, means supporting said armature for endwise movement from a first position adjacent said first end member to a second position adjacent said second end member, a pair of oppositely polarized permanent magnet ring members surrounding said armature and interposed between said end members, a ring of magnetic material interposed between said permanent magnet ring members and surrounding said armature, a hollow member of magnetic material surrounding said permanent magnet ring members and said ring, said hollow member being magnetically connected to said end members, one of said permanent magnet ring members inducing a first magnetic flux in said first end member and in said armature and in said ring and the other of said permanent magnet ring members inducing a second magnetic flux in said hollow member and in said first end member and in said armature and in said ring in a manner to reinforce said first flux whereby to maintain said armature in said first position, and an electromagnetic coil within said hollow member and surrounding said permanent magnet ring member and said ring, said coil when electrically energized being effective to oppose said first flux and to induce a third magnetic flux in said hollow member and in said second end member and in said armature and in said ring whereby to move said armature from said first position to said second position, said other permanent magnet ring member inducing, when said armature is moved into said second position, a fourth magnetic flux in said second end member and in said armature and in said ring, and said one permanent magnet ring member inducing a fifth magnetic flux in said hollow member and in said second member and in said armature and in said ring in a manner to reinforce said fourth magnetic flux whereby to maintain said armature in said second position.

4. An electromagnetic actuator comprising spaced first and second end members of magnetic material, an armature of magnetic material intermediate said end members, means supporting said armature for endwise movement from a first position adjacent said first end member to a second position adjacent said second end member, a pair of oppositely polarized permanent magnet ring members surrounding said armature and interposed between said end members, a hollow member of magnetic material surrounding said permanent magnet ring members and connected to said end members, one of said permanent magnet ring members inducing a first magnetic flux in said first end member and in said armature and the other of said permanent magnet ring members inducing a second magnetic flux in said hollow member and in said first end member and in said armature in a manner to reinforce said first flux whereby to maintain said armature in said first position, and an electromagnetic coil within said hollow member and surrounding said permanent magnet ring members, said coil when electrically energized being effective to oppose said first flux and to induce a third magnetic flux in said hollow member and in said second end member whereby to move said armature from said first position to said second position, said other permanent magnet ring member inducing, when said armature is moved to said second position, a fourth magnetic flux in said second end member and in said armature, and said one member inducing a fifth magnetic flux in said hollow member and in said second end member and in said armature in a manner to reinforce said fourth flux whereby to maintain said armature in said second position.

5. An electromagnetic actuator comprising a pair of spaced end members of magnetic material, said end members having inwardly extending coaxially arranged cylindrical bosses, a cylindrical armature of magnetic material intermediate said bosses, said armature being at least substantially of the same diameter as the diameter of said bosses and extending coaxially of said bosses, means supporting said armature for axial movement from a first position adjacent the boss of a first one of said end members to a second position adjacent the boss of a second one of said end members, a pair of oppositely polarized permanent magnet ring members surrounding said armature and interposed between said end members, a ring of magnetic material interposed between said permanent magnet ring members and surrounding said armature, one of said permanent magnet ring members inducing a first magnetic flux in said first end member and in said ring and in said armature and the other of said permanent magnet ring members inducing a second magnetic flux in said first end member and in said ring and in said armature in a manner to reinforce said first flux whereby to maintain said armature in said first position, and an electromagnetic coil surrounding said permanent magnet ring members and said ring, said coil when electrically energized being effective to oppose said first flux and to induce a third flux in said second end member and in said armature and in said ring whereby to move said armature from said first position to said second position, said other permanent magnet ring member inducing, when said armature is moved to said second position, a fourth magnetic flux in said second end member and in said ring and in said armature, and said first permanent magnet ring member inducing a fifth magnetic flux in said second end member and in said ring and in said armature in a manner to reinforce said fourth flux whereby to maintain said armature in said second position.

6. An electromagnetic actuator comprising a pair of spaced end members of magnetic material, said end members having inwardly extending coaxially arranged cylindrical bosses, a cylindrical armature of magnetic material intermediate said bosses, said armature being at least substantially of the same diameter as the diameter of said bosses and extending coaxially of said bosses, means supporting said armature for axial movement from a first position adjacent the boss of a first one of said end members to a second position adjacent the boss of a second one of said end members, a pair of oppositely polarized permanent magnet ring members surrounding said armature and interposed between said end members, one of said permanent magnet ring members inducing a first magnetic flux in said first end member and in said armature and the other of said permanent magnet ring members inducing a second magnetic flux in said first end member and in said armature in a manner to reinforce said first flux whereby to maintain said armature in said first position, and an electromagnetic coil surrounding said permanent magnet ring members, said coil when electrically energized being effective to oppose said first flux and to induce a third flux in said second end member and in said armature to move said armature from said first position to said second position, said other permanent magnet ring member inducing, when said armature is moved to said second position, a fourth magnetic flux in said second end member and in said armature, and said one permanent magnet ring member inducing a fifth magnetic flux in said second member and in said armature in a manner to reinforce said fourth flux whereby to maintain said armature in said second position.

7. An electromagnetic actuator comprising a pair of spaced end members of magnetically permeable material, an armature of magnetically permeable material intermediate said end members, means supporting said armature for endwise movement from a first position adjacent a first one of said end members to a second position adjacent a second one of said end members, a pair of oppositely polarized permanent magnet ring members surrounding said armature and interposed between said end members, a ring of magnetically permeable material interposed between said permanent magnet ring members and surrounding said armature, said permanent magnet ring members being each effective when said armature is moved to said first position to induce a magnetic flux in said first end member and in said ring and in said armature whereby to maintain said armature in said first position, and an electromagnetic coil effective to influence the flux induced by one of said permanent magnet ring members, said coil when energized opposing said flux induced by one of said magnetic ring members and inducing a flux in said second end member and in said armature and in said ring whereby to move said armature from said first position to said second position, said permanent magnet ring members being each effective when said armature is moved to said second position to induce a magnetic flux in said second end member and in said ring and in said armature whereby to maintain said armature in said second position.

8. An electromagnetic actuator comprising a pair of spaced end members of magnetically permeable material, an armature of magnetically permeable material intermediate said end members, means supporting said armature for endwise movement from a first position adjacent a first one of said end members to a second position adjacent a second one of said end members, a pair of oppositely polarized permanent magnet ring members surrounding said armature and interposed between said end members, said permanent magnet ring members being each effective when said armature is moved to said first position to induce a magnetic flux in said first end member and in said armature whereby to maintain said armature in said first position, and an electromagnetic coil effective to influence the flux induced by one of said permanent magnet ring members, said coil when energized opposing said flux induced by one of said magnetic ring members and inducing a flux in said second end member and in said armature whereby to move said armature from said first position to said second position, said permanent magnet ring members being each effective when said armature is moved to said second position to induce a magnetic flux in said second end member and in said armature whereby to maintain said armature in said second position.

References Cited in the file of this patent

UNITED STATES PATENTS

| | | |
|---|---|---|
| 2,435,425 | Cunningham | Feb. 3, 1948 |
| 2,450,924 | Stilwell | Oct. 12, 1948 |
| 2,505,904 | Matthias | May 2, 1950 |
| 2,579,723 | Best | Dec. 25, 1951 |
| 2,802,078 | Martin | Aug. 6, 1957 |